United States Patent Office 3,639,617
Patented Feb. 1, 1972

3,639,617
PROCESS FOR PREPARATION OF A PESTICIDE EMPLOYING SULFONATED LIGNINS
Ellis Gray King, Bellingham, Wash., assignor to Georgia-Pacific Corporation, Portland, Oreg.
No Drawing. Filed Feb. 21, 1968, Ser. No. 707,286
Int. Cl. A01n 9/12, 9/20, 9/34
U.S. Cl. 424—300
9 Claims

ABSTRACT OF THE DISCLOSURE

A process for the preparation of a pesticide in dry form by dispersing the pesticide in a sulfonated lignin solution and ball milling the dispersion until the particle size of at least 90 percent of the pesticide is reduced to less than 5 microns and then spray drying the mixture. The product obtained has a relatively high bulk density and is readily dispersible in water.

---

This invention pertains to a process for the preparation of a pesticide. More particularly, it pertains to an improvement for the preparation of a relatively dense, readily water-wettable and miscible dry pesticide.

A pesticide, to become widely accepted, must be available to the consumer in a form convenient to handle and apply. Even though a pesticide may be very selectively toxic to a wide variety of insects and pests and non-toxic to other animals and plant life, it may find limited utility if it cannot be easily handled or effectively applied by the normally used methods such as dusting or spraying.

Pesticides are preferably marketed in a dry form which can be used for dusting or used for spray application upon addition of water to form dispersions or emulsions. To obtain an acceptable product, it is necessary to have the pesticide in fine particle size, generally less than 5 microns. The small particle size permits the formation of relatively stable emulsions or dispersions which may be sprayed without the pesticide settling out. Unless stable emulsions or dispersions are obtained uniform application of the pesticide cannot be made, even though the particles may not settle sufficiently to plug the spray nozzles. It is also essential that the pesticide be readily wettable or miscible with liquids in order to be able to form the emulsion or dispersions conveniently. Another important factor for the acceptability of a dry pesticide is to have the product relatively dust-free. Often the pesticides are irritating chemicals and are very undesirable and hazardous to handle if dusty. In addition, it is also desirable to have a product that is relatively dense which not only cuts down the packaging problem but is more desirable for shipping.

In recent years a number of organic pesticides have become available which have very desirable toxic properties but have other properties making the pesticide difficult to use. Many of the organic pesticides are insoluble in water and undergo crystallization in a dry state so that they must be formulated by special means into particular types of compositions.

One method which has been suggested for the preparation of these pesticides is to dissolve the pesticide in a solvent and then intermix the pesticide solution with an aqueous lignosulfonate solution to obtain an emulsion from which the solvent and water are evaporated, leaving a dry powder containing a mixture of fine particles of the pesticide intermixed intimately with the lignosulfonate. Such a process is described in British Patent No. 573,832 which issued Dec. 7, 1945. Similar processes with different modifications are described in other patents and publications, for example, Netherlands Patent No. 6400575. These processes are especially desirable for many new pesticides such as naphthyl-alkyl carbamates and halogenated polyphenols which have limited solubility in solvents which are readily available and not toxic to plants. However, the product obtained by these processes, especially where the emulsion is spray dried, generally has a very low bulk density in the range of about 5 to 10 pounds per cubic foot or less and is very dusty. The product, being light, is spread by any stray breeze or disturbance. While granulation of the product by moistening the product in a rotating drum or on a rotating disc will increase the density of the material somewhat, the product still is very light and bulky and is not as readily wettable or miscible with water as would be desirable. A further disadvantage is that in the granulation of the product often large amounts of water must be added in order to effect the granulation.

A method also has been suggested for preparation of some of these insecticides in dry form in United States Letters Patent No. 3,164,516 where it is suggested that mixtures of the insecticide with 35% to 85% of lignosulfonic acid were intimately mixed and then subjected to air attrition mills or jet pulverizers. Products may be obtained by this method in fine particle size. However, the air attrition operation is expensive and the density of the product obtained, while considerably increased over the density of the product obtained by the former process described, is not entirely satisfactory. A further disadvantage is that generally the product is not readily wettable.

Another method has been suggested for preparation of DDT in British Patent No. 577,480. In this method DDT is ground in the presence of a large amount of dispersing agent, dried and then reground. While by this process an effective pesticide may be obtained for use as a concentrate, most of the difficulties and disadvantages of dry grinding are encountered upon regrinding of the mixture of dispersant and DDT.

It is therefore an object of this invention to provide an extremely finely divided pesticide in powder form having a high bulk density. A further object is to provide a process for the preparation of a pesticide in micron size and submicron size. A still further object is to provide a pesticide product which may be easily granulated.

The above and other objects are attained by adding from 20% to 50% of the water-insoluble pesticide in granular form to an aqueous solution of a sulfonated lignin-containing material having from 25 to 50 weight percent of solids, ball-milling the mixture without the addition of other additives to reduce the particles size of at least 90% of the pesticide to less than 5 microns and spray drying the mixture to obtain the pesticides in dry powder form. The spray dried product may then be granulated or pelletized using water as a pelletizing fluid in the ordinary granulating and pelletizing equipment. Surprisingly, the spray dried product has improved properties and has a bulk density of over 40 lbs./cu. ft. which is appreciably higher than that normally obtained for spray dried lignosulfonates or sulfonated lignin-containing material. Since it has relatively high density, the problems of dusting associated with light weight and fine powders are considerably diminished. It is believed that by ball-milling, fine particles of pesticide are obtained which upon spray drying become uniformly encased by a protective shell of the lignosulfonate, thus imparting improved dispersibility and wetting properties as well as permitting the storage of the dry material without deterioration. The encasement also results in obtaining a spray dried particle of relatively large size, being about 200 microns, which may be easily granulated using water.

It is apparent that the term "ball-milled" or "ball-milling" is used herein generically and means the grinding of the material by impact and attrition obtained by movement of hard, solid particles in a confined space, effected by movement of the mill as a whole regardless of the shape of the particles. Illustrative examples of the types of mills which may be used to effect the grinding are often referred to as ball, pebble, rod, tube, compartment and vibrating mills. Obviously, in grinding heat sensitive material, cooling may have to be used to dissipate some of the heat generated by the grinding.

The concentration of the solution of the sulfonated lignin-containing material in which the pesticide is ball-milled is in the range of 25% to 50% of solids. Upon addition of the pesticide to the lignosulfonate solution in the above concentrations, generally the slurry obtained will have the necessary viscosity and consistency to obtain the extremely fine particle size upon ball-milling. A solution containing at least 25% lignosulfonate solids provides the necessary dispersing action to permit the formation of the pesticide in fine particle size. Solutions containing over 50% may be too viscous to obtain the optimum results, especially if high concentration of the pesticide is desired. In addition to obtaining the proper viscosity of the slurry to effect the desired size reduction, sufficient amount of the spent sulfite liquor must be used to obtain the proper coating of the pesticide particles in the final product upon spray drying so that it is in a form which will give a readily dispersible product and also provide the necessary separation of the pesticide particles to keep them from decomposing or agglomerating upon storage. Thus, the ratio of the lignosulfonate solids to pesticide is maintained from at least 1:2 to 3:1, preferably at least 1:1. Generally lignosulfonate solutions containing 30% to 40% solids will have the desired viscosity for the range of pesticide concentrations normally used. When higher concentration lignosulfonate solutions may be desired, lower molecular weight lignosulfonates may be advantageously employed. For example, generally lower molecular weight lignosulfonates are obtained wherein the product is concentrated by vacuum evaporation instead of evaporation at higher temperatures which may result in some polymerization of the lignosulfonates during the concentration.

The sulfonated lignin-containing material used may be obtained by sulfonation, by the various known methods, of lignin obtained from any source. Lignin is a polymeric substance of substituted aromatics found in plant and vegetable tissue associated with cellulose and other plant constituents. Thus, vegetable and plant tissue are lignin-containing materials which are the principal sources of lignin.

One of the main sources for sulfonated lignin-containing material is the residual pulping liquors from the paper and pulp industry where lignocellulosic materials such as wood, straw corn stalks, bagasse and the like are processed to separate the cellulose or pulp from the lignin. In the sulfite pulping process, the lignocellulosic material is digested with a bisulfite or sulfite to obtain a sulfonated residual pulping liquor commonly referred to as "spent sulfite liquor" wherein the sulfonated lignin is dissolved. In other pulping processes, the residual pulping liquor as obtained from the process may not be a sulfonated product. However, the residual liquors or products containing the lignin portion of the lignocellulosic materials from the other process and also from the sulfite process may be treated by various known methods to sulfonate the lignin to the different degrees desired. For example, the residual liquor obtained in an alkaline pulping process such as kraft, soda or other alkaline process may be sulfonated by reacting the product with a bisulfite or sulfite to obtain a sulfonated residual pulping liquor. Likewise, lignins known as "hydrolysis lignin" obtained from the hydrolysis of lignocellulose and "hydrotropic lignins" derived from the hydrotropic pulping process may be sulfonated and used.

The lignosulfonate products in the sulfite pulping process or by the sulfonation of other residual pulping liquors or lignin-containing material may contain many other constituents besides sulfonated lignin. While these other materials may be removed, it is not necessary to do so. The pulping liquors may be fractionated to obtain lignosulfonates of a particular molecular weight, subjected to alkaline, heat, or an acid treatment, as well as oxidized or subjected to halogenation such as chlorination. While the above treatments may alter the products somewhat, the basic properties are not materially changed and such products may be used. Also the lignosulfonates or spent liquors may be subjected to further sulfonation to obtain a reduction in the average molecular weight. However, generally the sulfonated pulping liquor is used without any further processing or treatment other than the removal of the sulfurous acid which may be present in the spent sulfite liquor.

The sulfonated lignins obtained upon the sulfonation of lignin may be salts of certain metals such as magnesium, calcium, ammonium, sodium and others. The lignosulfonate thus obtained may be used as such or converted to salts or complexes of other metals including metals known to have pesticidal properties such as copper or mercury, or nutritional value, such as trace elements. Also, the lignosulfonate salts as obtained from the pulping process may be converted to lignosulfonic acid by addition of acid or use of ion exchange resins and then used.

Illustrative examples of pesticides which may be prepared by the process of the invention are the well known tetralkyl thiurium disulfides, such as bis(dimethylthiocarbamyl)disulfide and dithiocarbamates such as manganese or zinc ethylenebisdithiocarbamate and ferric, zinc, manganese and other heavy metal salts of dimethyldithiocarbamic acid ethylmethyldithiocarbamic acid, n-butylthiocarbamic acid and of other dithiocarbamic acids derived from primary and secondary amines. Other suitable pesticides are derivatives of rhodanine, such as 3-(p-chlorophenyl)-5-methylrhodanine, N-trichloromethylmercapto-4-cyclohexene-1,2-dicarboximide (Captan) and others, such as 2-sec-butyl-4,6-dinitrophenyl-3-methyl-2-butenoate (Morocide); 1-naphthyl-N-methylcarbamate (Sevin); N-trichloromethylthiophthalimide (Folpet). Also, halogenated aromatics such as 1,1,1-trichloro-2,2-bis(p-methoxyphenyl)ethane (Methoxychlor) and 1,2,3,4,10,10-hexachloro - 6,7 - epoxy-1,4,4a,5,6,7,8,8a-octahydro 1,4,5,8-dimethanolnaphthalene (Dieldrin) and homologue thereof, sold under the trademarks of Aldrin and Endrin and 4-chlorophenyl-2,4,5-trichlorophenyl sulfone (Tedion) are further examples of some of the pesticides which may be thus prepared.

In spray drying the ground mixture of lignosulfonate and pesticide, the various known spray dryers and methods may be used. Generally, the mixture after grinding is atomized and spray dried without any dilution at temperatures below the deterioration temperature of the pesticide. A higher density product is usually obtained upon spray drying of a relatively concentrated solution.

Likewise, the various known granulating and pelletizing equipment may be used for the granulation of the product. Generally water in an amount of 4 to 12 percent is used as the granulating fluid but other lignosulfonic solvents wherein the pesticide is insoluble may be employed.

EXAMPLE I

To a 12-inch ball mill, 400 grams of a miticide, 2-sec-butyl-4,6-dinitrophenyl-3-methyl-2-butenoate, with 1200 grams of a 50 weight percent aqueous solution of a sulfonated lignin-containing material were added. The sulfonated lignin-containing material was a fermented, calcium base spent sulfite liquor from which the alcohol formed by the fermentation was stripped. The ball mill contained 7.4 kilograms of ¾" ceramic cylinders and was operated at 37 r.p.m. for 48 hours, at which time the particle size of the miticide had been reduced to 1 to 1.5 microns. The ball milled product was then spray dried, employing an inlet temperature of 100° to 120° C. and an outlet temperature of 50° to 60° C. The spray dried particles obtained were irregular shaped particles, having an average size of around 200 microns and a bulk density of 42.7 lbs./cu. ft.

The spray dried product was then granulated in a rotating drum-type granulator employing water as the granulating fluid. The amount of water used was about 8% of the weight of the spray dried product. The product was screened through a 14-mesh screen and dried at 70° F. for two hours.

The granulated product had a bulk density of 34.6 lbs./cu. ft. and a wetting time of 5 seconds. In a suspendability test 5 grams of the granulated material was suspended in 100 ml. of water and the amount of sediment settling out over a given period of time was determined. No measurable amount of sedimentation was obtained in 24 hours and only 0.2 cc. of sedimentation was noted after 4 days.

In a manner similar to that described above, an insecticide 1-naphthyl-N-methyl carbamate was ball-milled, spray dried and granulated. The spray dried product had a bulk density of 45.5 lbs./cu. ft. and after granulation gave a product having 32.5 lbs./cu. ft.

A miticide, 4-chlorophenyl-2',4',5'-trichlorophenyl sulfone, was similarly ball-milled, spray dried and granulated. The solution of the sulfonated lignin-containing materials used contained 31 weight percent of spent sulfite liquor solids. The weight ratio of the spent sulfite liquor solids to the pesticide was 1:1. The granulated product obtained had a bulk density of 40.5 lbs./cu. ft. and a wetting time of less than two seconds. A product prepared by dry air milling of the pesticide with spent sulfite liquor solids in the same ratio and granulated as above had a bulk density of 29.3 lbs./cu. ft. and a wetting time of 90 seconds.

What is claimed is:

1. A process for the preparation of a pesticide in powder form which comprises adding a water-insoluble pesticide in granular form to an aqueous lignosulfonate solution of from 25 to 50 weight percent concentration, said water-insoluble pesticide being added in a weight ratio of lignosulfonate to the pesticide in the range of 1:2 to 3:1, ball-milling the mixture to reduce the particle size of at least 90 percent of the pesticide to less than 5 microns, and spray drying the mixture to obtain the pesticide in dry powder form, said pesticide being selected from the group consisting of 3-(p-chlorophenyl)-5-methylrhodanine,
1-naphthyl-N-methylcarbamate,
1,1,1-trichloro-2,2-bis(p-methoxyphenyl)ethane,
1,2,3,4,10,10-hexachloro-6,7 epoxy-1,4,4a,5,6,7,8,8a-octahydro 1,4,5,8-dimethanonaphthalene,
aldrin, endrin,
4-chlorophenyl-2,4,5-trichlorophenyl sulfone,
2-sec-butyl-4,6-dinitrophenyl-3-methyl-2-butenoate,
N-trichloromethylthiophthalimide,
N-trichloromethylmercapto-4-cyclohexene-1,2-dicarboximide,
bis(dimethylthiocarbamyl) disulfide, manganese or zinc ethylenebisdithiocarbamate and ferric, zinc, or manganese salts of dimethyldithiocarbamic acid, ethylmethyldithiocarbamic acid or n-butylthiocarbamic acid.

2. A process according to claim 1 wherein the aqueous solution of lignosulfonate is a spent sulfite liquor.

3. A process according to claim 2 wherein the spent sulfite liquor contains from 30 to 40 weight percent solids.

4. A process for the preparation of a pesticide in powder form which comprises adding a water-insoluble pesticide in granular form to an aqueous lignosulfonate solution of from 25 to 50 weight percent concentration, said water-insoluble pesticide being added in a weight ratio of lignosulfonate to the pesticide in the range of 1:2 to 3:1, ball-milling the mixture to reduce the particle size of at least 90 percent of the pesticide to less than 5 microns, spray drying the mixture to obtain the pesticide in dry powder form, and granulating the spray dried mixture, said pesticide being selected from the group consisting of 3-(p-chlorophenyl)-5-methylrhodanine,
1-naphthyl-N-methylcarbamate,
1,1,1-trichloro-2,2-bis(p-methoxyphenyl)ethane,
1,2,3,4,10,10-hexachloro-6,7 epoxy-1,4,4a5,6,7,8,8a-octahydro 1,4,5,8-dimethanonaphthalene,
aldrin, endrin,
4-chlorophenyl-2,4,5-trichlorophenyl sulfone,
2-sec-butyl-4,6-dinitrophenyl-3-methyl-2-butenoate,
N-trichloromethylthiophthalimide,
N-trichloromethylmercapto-4-cyclohexene-1,2-dicarboximide,
bis(dimethylthiocarbamyl) disulfide, manganese or zinc ethylenebisdithiocarbamate, and ferric, zinc, or manganese salts of dimethyldithiocarbamic acid, ethylmethyldithiocarbamic acid or n-butylthiocarbamic acid.

5. A process according to claim 4 wherein the aqueous solution of lignosulfonate is a spent sulfite liquor.

6. A process according to claim 5 wherein the spent sulfite liquor contains from 30 to 40 weight percent solids.

7. A process according to claim 5 wherein the pesticide is 1-naphthyl-N-methylcarbamate.

8. A process according to claim 5 wherein the pesticide is 2-sec-butyl-4,6-dinitrophenyl-3-methyl-2-butenoate.

9. A process according to claim 5 wherein the pesticide is 4-chlorophenyl-2,4,5-trichlorophenyl sulfone.

References Cited

UNITED STATES PATENTS 3,164,516  1/1965  Geary _____ 424—278

FOREIGN PATENTS 577,480  5/1945  Great Britain.
724,219  12/1965  Canada _____ 424—314

OTHER REFERENCES

Chem. Abstracts, vol. 55 (1961), p. 10783b.

STANLEY J. FRIEDMAN, Primary Examiner

V. D. TURNER, Assistant Examiner

U.S. Cl. X.R.

424—270, 274, 287, 289, 295, 314, 328, 337, 353, 354